United States Patent
Ikeda et al.

(10) Patent No.: US 10,732,540 B2
(45) Date of Patent: Aug. 4, 2020

(54) DEVELOPING ROLLER

(71) Applicants: NOK CORPORATION, Tokyo (JP);
SYNZTEC CO., LTD., Tokyo (JP)

(72) Inventors: Atsushi Ikeda, Kanagawa (JP);
Hiroaki Kaneda, Kanagawa (JP);
Tomohiro Kondo, Kanagawa (JP);
Goki Inukai, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/610,448

(22) PCT Filed: Jun. 12, 2018

(86) PCT No.: PCT/JP2018/022441
§ 371 (c)(1),
(2) Date: Nov. 1, 2019

(87) PCT Pub. No.: WO2019/003901
PCT Pub. Date: Jan. 3, 2019

(65) Prior Publication Data
US 2020/0125003 A1     Apr. 23, 2020

(30) Foreign Application Priority Data

Jun. 27, 2017  (JP) ................. 2017-125141

(51) Int. Cl.
*G03G 15/08* (2006.01)
*C09D 7/40* (2018.01)
*C09D 5/00* (2006.01)

(52) U.S. Cl.
CPC ......... *G03G 15/0818* (2013.01); *C09D 5/00* (2013.01); *C09D 7/69* (2018.01); *G03G 15/0808* (2013.01); *G03G 2215/0861* (2013.01)

(58) Field of Classification Search
CPC .......... G03G 15/0808; G03G 15/0818; G03G 2215/0861; G03G 2215/0869; C09D 7/69; C09D 5/00
See application file for complete search history.

(56) References Cited

U.S. PATENT DOCUMENTS 6,270,449 B1   8/2001  Hirayama
6,360,069 B1   3/2002  Mimura et al.
(Continued)

FOREIGN PATENT DOCUMENTS

JP      11-84859         3/1999
JP      2000-187385 A    7/2000
(Continued)

OTHER PUBLICATIONS

International Search Report from corresponding PCT application No. PCT/JP2018/0224410 dated Jul. 24, 2018 (4 pgs).
(Continued)

*Primary Examiner* — Carla J Therrien

(57) ABSTRACT

A developing roller having a rubber elastomer layer on the outer periphery of a shaft core metal, having a coating layer formed from a binder (A) and silicone rubber particles (B) on the surface of the rubber elastomer, and having an electrostatic capacitance of 4 to 20 nF; wherein the binder (A) is formed from a diluting solvent solution of a terminal hydroxyl group-containing prepolymer (a) obtained by reaction of an isocyanate compound, an isocyanurate modified product thereof and a reactive silicone oil, and an isocyanate compound and/or an isocyanurate modified product thereof (b). This developing roller suppresses banding by suppressing electrostatic capacitance even if the nip width between the developing roll and the photoreceptor changes due to distortion of peripheral members in the development apparatus, and stick slip (vibration) of gears.

12 Claims, 1 Drawing Sheet

(56) References Cited

U.S. PATENT DOCUMENTS

| | | | |
|---|---|---|---|
| 8,550,968 B2* | 10/2013 | Sugimura | G03G 15/0818 |
| | | | 492/53 |
| 2014/0212184 A1 | 7/2014 | Juri et al. | |
| 2015/0185655 A1* | 7/2015 | Magome | G03G 15/0808 |
| | | | 430/106.1 |
| 2015/0185656 A1* | 7/2015 | Ito | G03G 15/0818 |
| | | | 399/286 |
| 2016/0187808 A1 | 6/2016 | Kim | |
| 2016/0274489 A1* | 9/2016 | Juri | G03G 15/0818 |
| 2017/0023876 A1 | 1/2017 | Higashira et al. | |
| 2017/0045840 A1 | 2/2017 | Higashira et al. | |
| 2017/0242361 A1* | 8/2017 | Atami | C09D 135/02 |
| 2017/0285513 A1* | 10/2017 | Fujisawa | G03G 15/1685 |
| 2017/0308000 A1* | 10/2017 | Fujisawa | F16C 13/00 |

FOREIGN PATENT DOCUMENTS

| | | |
|---|---|---|
| JP | 2011-253153 A | 12/2011 |
| JP | 2012-063591 A | 3/2012 |
| JP | 2012-103581 A | 5/2012 |
| JP | 2014-1460010 A | 8/2014 |
| JP | 5623211 | 10/2014 |
| WO | WO 2015/098310 A1 | 7/2015 |
| WO | WO 2015/156330 A1 | 10/2015 |

OTHER PUBLICATIONS

Notification of Transmittal of Translation of the International Preliminary Report on Patentability in Corresponding application PCT/JP2018/022441.

International Preliminary Report on Patentability in Corresponding application PCT/JP2018/022441.

* cited by examiner

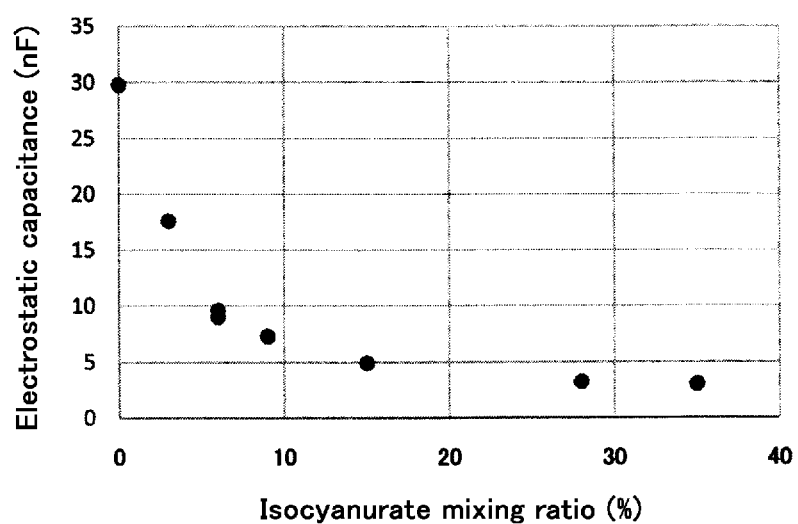

DEVELOPING ROLLER

RELATED APPLICATION

This application is a 35 U.S.C. § 371 national phase filing of International Patent Application No. PCT/JP2018/022441, filed Jun. 12, 2018, which claims priority under 35 U.S.C. § 119 to Japanese Patent Application No. 2017-125141, filed Jun. 27, 2017, the entire disclosure of which is hereby expressly incorporated by reference.

TECHNICAL FIELD

The present invention relates to a developing roller. More specifically, the present invention relates to a developing roller that suppresses banding.

BACKGROUND ART

In a development apparatus of a nonmagnetic one-component development system, a developing roller and each member of a photoreceptor drum, a feed roller, and a toner regulating blade are rubbed through a toner layer during operation of the development apparatus. The toner is charged by electrostatic friction at the developing roll and the toner regulating blade, and transferred to an electrostatic latent image formed on the surface of the photoreceptor, and development is performed.

In order to stably feed the toner to the surface of the photoreceptor, the developing roll rotates at a higher speed than the photoreceptor to form images. In this case, distortion occurs between the developing roll and contact members in pressure contact with the developing roll. When the distortion is removed, stick slip (vibration) occurs.

Accordingly, the nip width between the photoreceptor and the developing roll changes, and the amount of toner fed to the electrostatic latent image changes. Further, vibration and rotation unevenness by gears of the developing roll, photoreceptor, etc., cause stick slip, transfer of the toner from the developing roll onto the photoreceptor changes, and banding (horizontal stripes) of a constant period occurs in the printed image.

For the occurring stick slip, changes in the contact area by stick slip are reduced by releasing the vibration of the constituent material of each member in the development apparatus, and improving driving members (gears); thus, improvements are made for banding.

Regarding developing rollers, the following prior arts have been proposed.

Patent Document 1 proposes a developing roller having a shaft core body and at least one resin layer provided around the shaft core body, wherein the outermost layer of the developing roller comprises a polyurethane resin (A) as a binding resin and polyurethane resin particles (B) dispersed in the polyurethane resin. For distortion generated between the developing roller and the contact member during rotation, the loss tangent of a second layer configured to have a two-layer structure is set within a fixed range, whereby recovery from deformation is slowed down to suppress rotation unevenness, thereby forming stable images.

Patent Document 2 makes the same proposal by forming the second layer from butyl rubber.

Patent Document 3 proposes a developing roller comprising a conductive shaft, an elastomer layer provided on the outer peripheral surface of the shaft, and a surface layer, wherein the elastomer layer contains spherical silica particles, and the spherical silica particles are unevenly distributed so that they are contained in large amounts on the interface side with the surface layer at the axial both ends of the developing roller. Because the spherical silica particles in the elastomer layer are thus unevenly distributed, gaps are formed between the spherical silica particles, and an increase in stick slip is suppressed. Moreover, because regions that contain a large amount of spherical silica particles are present at the ends of the developing roll, toner deterioration is suppressed, and the occurrence of banding is suppressed.

However, the causes for expressing banding include, in addition to rotation unevenness with peripheral members, clearance between the gears of each member, and influence of stick slip caused by abrasion. These may cause banding.

The present applicants have proposed a rubber member for coating a developing roll obtained by curing a coating layer component around a developing roll; wherein the coating layer component comprises (A) a liquid binder comprising a polyol, an isocyanate compound and a reactive silicone oil, (B) specific silicone rubber particles, and (C) a diluting solvent and the ratio of the rubber particle diameter to the thickness of the coating layer after curing (rubber particle diameter/coating layer thickness) satisfies <0.3 (Patent Document 4).

The present applicants also have proposed a method for producing a rubber member for a developing roll obtained by applying a coating layer component comprising silicone rubber particles and a binder around a developing roll having a rubber base layer, and curing the coating layer, wherein a reactive silicone oil, an isocyanate compound, and a diluting solvent capable of dissolving both the reactive silicone oil and the isocyanate compound are placed in a reaction vessel, allowed to react in the diluting solvent to perform a prepolymerization reaction while dissolution in the solvent is maintained, then the reaction solution is mixed with a polyol and an isocyanate compound solution, further silicone rubber particles are mixed to prepare a coating liquid of a coating layer component comprising silicone rubber particles and a binder, and the coating liquid is applied around the developing roll and cured (Patent Document 5).

PRIOR ART DOCUMENTS

Patent Documents

Patent Document 1: JP-A-2012-103581
Patent Document 2: JP-B-5623211
Patent Document 3: JP-A-2011-253153
Patent Document 4: WO 2015/098310 A1
Patent Document 5: WO 2015/156330 A1

OUTLINE OF THE INVENTION

Problem to be Solved by the Invention

An object of the present invention is to provide a developing roller that suppresses banding by suppressing electrostatic capacitance even if the nip width between the developing roll and the photoreceptor changes due to distortion of peripheral members in the development apparatus, and stick slip (vibration) of gears.

Means for Solving the Problem

The above object of the present invention can be achieved by a developing roller having a rubber elastomer layer on the outer periphery of a shaft core metal, having a coating layer formed from a binder (A) and silicone rubber particles (B) on the surface of the rubber elastomer, and having an electrostatic capacitance of 4 to 20 nF; wherein the binder (A) is formed from a diluting solvent solution of a terminal hydroxyl group-containing prepolymer (a) obtained by reaction of an isocyanate compound, an isocyanurate modified product thereof and a reactive silicone oil, and an isocyanate compound and/or an isocyanurate modified product thereof (b).

Effect of the Invention

The electrostatic capacitance of the developing roller according to the present invention is adjusted to 4 to 20 nF, preferably 4 to 10 nF, whereby the toner charge amount of the developing roller surface can be controlled.

Further, even if the electric field strength is low, the required developing efficiency (toner transfer amount) can be maintained. Even if the contact area between the photoreceptor and the developing roller changes to induce a state in which the electric field strength is low, smooth toner transfer from the developing roller to the photoreceptor can be achieved by electrical action.

Moreover, due to the smooth toner transfer, the occurrence of banding (horizontal stripes) of a constant period in the printed image can be suppressed.

Furthermore, image quality evaluation determined by the maximum banding intensity and a toner fuel consumption test is improved.

BRIEF DESCRIPTION OF DRAWINGS

FIG. 1: A graph showing the relationship between the mixing ratio (%) of an isocyanurate modified product in the binder component as solid matters, and the electrostatic capacitance (nF).

EMBODIMENTS FOR CARRYING OUT THE INVENTION

A rubber elastomer layer is provided on the outer periphery of a shaft core metal, and a coating layer is provided on the surface of the rubber elastomer layer. As the rubber elastomer layer mentioned herein, silicone rubber, polyurethane-based thermoplastic elastomer, EPDM, SBR, NBR, hydrogenated NBR, polychloroprene rubber, epichlorohydrin rubber, and the like are generally used; conductive silicone rubber is preferably used.

The coating layer is formed from a binder (A) and silicone rubber particles (B). The binder is obtained by performing a prepolymerization reaction of an isocyanate compound, an isocyanurate modified product thereof and a reactive silicone oil in a diluting solvent capable of dissolving these components so that the resulting prepolymer contains a hydroxyl group at its terminal, and adding thereto a diluting solvent solution of an isocyanate compound and/or an isocyanurate modified product thereof. If the terminal group of the prepolymer is an isocyanate group, it is considered that the group easily reacts with the moisture in the air, and that the structure changes; thus, a hydroxyl group is used to suppress changes over time and to maintain storage stability.

Examples of the isocyanate compound include aliphatic diisocyanates represented by hexamethylene diisocyanate, and aromatic diisocyanates, such as diphenylmethane diisocyanate and tolylene diisocyanate; aliphatic diisocyanates are preferably used.

The hexamethylene diisocyanate, which is an aliphatic diisocyanate, may be an adduct type. For example, one represented by the general formula $R^1(OCONHRNCO)_3$ may be used. As such adduct type hexamethylene diisocyanate, commercial products, such as Duranate E402-80B (produced by Asahi Kasei Corp.; solid matters content: 80%, NCO: 7.3 wt. %, viscosity: 350 mPa·s/25° C., solvent: n-butyl acetate) and Duranate E405-70B (produced by Asahi Kasei Corp.; solid matters content: 70%, NCO: 6.2 wt. %, viscosity: 120 mPa·s/25° C.), can be used as they are.

An isocyanurate modified product of an isocyanate compound is commercially available as, for example, Duranate TPA-100 (produced by Asahi Kasei Corp.; solid matters content: 100%, NCO: 23.1 wt. %, viscosity: 1400 mPa·s/25° C.), and has the following structure:

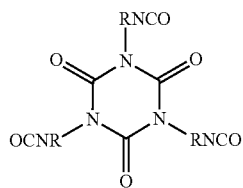

Other examples include Coronate HXLV (produced by Tosoh Corporation; solid matters content: 100%, NCO: 22.5 to 23.9 wt. %, viscosity: 800 to 1500 mPa·s/25° C.), Burnock DN-981 (produced by DIC Corporation; solid matters content: 75%, NCO: 13.0 to 14.0 wt. %, viscosity: Gardner (25° C.) A-D, solvent: ethyl acetate), and the like.

The isocyanurate modified product is used at a ratio of about 1 to 20 wt. %, preferably about 1.5 to 10 wt. %, in the binder component as solid matters, which are the total amount of the components (a) and (b). If the ratio of the isocyanurate modified product is less than this range, banding evaluation, which is one criterion for image quality evaluation, is inferior. In contrast, if the ratio of the isocyanurate modified product is greater than this range, a toner fuel consumption test, which is one criterion for image quality evaluation, is not satisfied. That is, electrostatic capacitance is reduced, and the amount of toner transfer increases, whereby the consumption rate of the toner becomes high. In each Example of Patent Document 5 mentioned above, an isocyanate compound is singly used.

As the reactive silicone oil, one having active hydrogen that can react with an isocyanate compound and an isocyanurate modified product thereof is used. The reactive silicone oil having active hydrogen is mono-, bi- or higher functional. Examples thereof include amino-modified, mercapto-modified, carboxyl-modified, phenol-modified, or alcoholic hydroxyl group-modified dimethylpolysiloxane, methylhydrogenpolysiloxane, and the like. Particularly preferable reactive silicone oils are those having —$C_3H_6OC_2H_4OH$ as a terminal group. For example, Silicone Oil X-22-160AS (produced by Shin-Etsu Chemical Co., Ltd.; viscosity: 35 mPa·s, reactive group equivalent: 470 g/mol) is used.

A polyol can be used in combination with the reactive silicone oil. As the polyol, for example, a fluorine-containing polyol can be used. The fluorine-containing polyol reacts with an isocyanate compound not only to form a coating layer having a larger triboelectrification series, but also to reduce the resistance environment dependency of the formed coating layer. The higher the fluorine content of the fluorine-containing polyol is, the larger in negative the triboelectrification series becomes.

Examples of such fluorine-containing polyols include such as copolymer polyols of trifluoroethylene or tetrafluoroethylene. In practice, commercial products, such as Zeffle (produced by Daikin Industries, Ltd.), Lumiflon (produced by AGC Inc.), and Defencer (produced by DIC Corporation), are used as they are. The ratio of the polyol used in combination is about 1 to 50 parts by weight, preferably 15 to 30 parts by weight, based on 100 parts by weight of the reactive silicone oil.

The prepolymerization reaction to form a prepolymer having a terminal hydroxyl group is performed in the following manner. For example, when the group having active hydrogen is OH, OH is used so that the equivalent ratio of NCO/OH is 0.2 to 0.5, and an isocyanate compound, an isocyanurate modified product thereof, and a reactive silicone oil are allowed to react in a diluting solvent capable of dissolving these components. The reaction is performed in a state in which each component is dissolved in the solvent. Because a prepolymerization reaction is performed in this state, even if the solvent is vaporized, the reactive silicone oil is not separated, and a uniform coating can be formed.

As the diluting solvent, one that can dissolve each component, i.e., an isocyanate compound, an isocyanurate modified product, and a reactive silicone oil, is used. As such diluting solvents, acetates, such as n-butyl acetate and ethyl acetate, are preferably used. In addition to these, ketones, such as methyl ethyl ketone, methyl isobutyl ketone, acetone, tetrahydrofuran, and cyclohexanone; and aromatic or aliphatic hydrocarbons, such as toluene, xylene, and heptane are properly used.

The formed terminal hydroxyl group-containing prepolymer (a) forms a binder (A) in the diluting solvent, together with at least one of an isocyanate compound and an isocyanurate modified product thereof (b) that are preferably the same as those used for prepolymer formation. The use of the component (b) here is intended to enable the formation of a uniform coating film without separation even when the solvent is volatilized after coating the coating liquid.

The silicone rubber particles (B) are preferably organopolysiloxanes, such as dimethylpolysiloxane and methylhydrogenpolysiloxane, and those having a particle size of about 0.2 to 10 μm, preferably about 1 to 5 μm, are generally used. In practice, commercial products, such as the EP series produced by Dow Corning Toray Co., Ltd. having a predetermined particle size, are used as they are.

The silicone rubber particles are used at a ratio of about 3 to 30 wt. %, preferably about 5 to 20 wt. %, in the coating liquid.

The coating liquid, which comprises a terminal hydroxyl group-containing prepolymer (A) and silicone rubber particles (B), and which has a solid matters content (coating layer-forming component) of 10 to 50 wt. %, preferably 25 to 40 wt. %, is dispersed in the diluting solvent using a bead mill, ultrasonic waves, a homogenizer, an ultrasonic homogenizer, a nanomizer, a dissolver, a disperser, a high-speed impeller, or the like. The coating of the coating liquid to the rubber layer can be carried out by any known method, such as a dipping method, a spray method, a roll coating method, a doctor blade method, or a flow coating method, preferably interposed by a primer. Drying is performed at room temperature to 150° C. for about 5 to 60 minutes to form a coating film having a film thickness of about 5 μm or more, preferably about 5 to 10 μm.

The developing roller comprising such a coating layer formed on the surface of the rubber elastomer on the outer periphery of the core metal has an electrostatic capacitance of 4 to 20 nF, preferably 4 to 10 nF.

If the electrostatic capacitance of the developing roller is larger than 20 nF, the image force between the developing roll and the toner increases, the toner transfer properties decrease, print density decreases, and banding occurs.

In contrast, if the electrostatic capacitance is smaller than 4 nF, the image force between the developing roll and the toner decreases, the toner transfer properties increases, and the occurrence of banding can be suppressed; however, print density increases, and other defects, such as deterioration of toner fuel consumption, occur.

Therefore, it is preferable to adjust the electrostatic capacitance of the coating layer in contact with the toner. Controlling the electrostatic capacitance of the coating layer can be performed by selecting the mixing ratio of the binder component in the coating liquid used to form the coating layer, more specifically, the mixing ratio of an isocyanurate modified product thereof to an isocyanate compound used to form a prepolymer (see the graph of FIG. 1).

In addition to the control of electrostatic capacitance, due to the use of a reactive silicone oil as a polyol component of the prepolymer, the coating layer used in the developing roller of the present invention reduces surface tension, improves the mold release characteristics between the roller and the toner components, and suppresses filming. Moreover, the use of silicone rubber particles is intended to improve non-adhesion, and to form projections on the coating layer to reduce deterioration of the toner due to point contact.

Furthermore, because the compatibility between a reactive silicone oil and an isocyanate compound or an isocyanurate modified product thereof is low, a sea-island structure is easily formed, and surface roughness is not stable; however, a prepolymerization reaction is performed to form a film with uniform surface roughness (unevenness was controlled), thereby enabling control of toner transfer properties.

The developing roller according to the present invention is effectively used as a developing roller for image forming devices used in development apparatuses, such as copying machines, facsimiles, and laser beam printers.

EXAMPLES

The following describes the present invention with reference to Examples.

Examples 1 to 5

A reactive silicone oil, an isocyanate compound, an isocyanurate modified product thereof, and a diluting solvent capable of dissolving these components were placed into a reaction vessel. These components were allowed to react in the diluting solvent to thereby perform a prepolymerization reaction. Subsequently, the prepolymerization reaction solution (solid matters content: 50%) was mixed with an isocyanate compound, an isocyanurate modified product thereof, and silicone rubber particles, to produce a coating liquid, which was a coating layer-forming component comprising a binder prepared as a diluting solvent solution and silicone rubber particles (solid matters content in the solution: 34%).

An iron shaft core metal having an outer diameter of 10 mm was coated with conductive silicone rubber having a volume resistivity of $10^{-6}$ Ω·cm and a hardness (JIS A) of 40. Grinding was performed using a cylindrical grinder to adjust the 10-point average roughness (JIS 94) to 2 μm Rz, to produce a rubber-coated roller having an outer diameter of 16 mm.

After a primer (KBP-40, produced by Shin-Etsu Chemical Co., Ltd.) was spray-coated to the surface of the rubber-coated roller, the above coating liquid was dispersed by high speed stirring with a bead mill, and further stirred with a stirrer for 1 hour, followed by spray coating. Then, heat treatment was performed at 160° C. for 40 minutes.

Evaluation Method

Electrostatic Capacitance Measurement:

An electrode was produced with conductive paste on the surface of the coating layer-formed developing roller using a measuring apparatus IM3533-01 (produced by HIOKI E. E. Corporation) in the following measurement environment: temperature: 24.6° C., humidity: 49% RH. The electrostatic capacitance between the conductive paste and the core metal was measured with an LCR meter. The measured frequency was 10 Hz, which corresponds to the toner delivery period of the developing roller.

Banding Evaluation Method:

The rubber-coated roller to which the coating liquid of each specification was applied was inserted into a cartridge (TN-27J, produced by Brother Industries, Ltd.) of a monochrome laser printer (HL-2240D, produced by Brother Industries, Ltd.), and sheet passing durability was examined in a high temperature and high humidity environment (30° C., 80% RH). A halftone image was printed on every 1000 sheets of paper, and taken in monochrome (300 dpi) using a scanner (X830, produced by Seiko Epson Corporation). The luminance of the scanned image was subjected to fast Fourier transform, and frequency with an evaluation length of 1 Hz and its spectral intensity were calculated. The optional range of the printed part was about 173.4 mm square.

When the spectral intensity of the target frequency (91 Hz) was 2.0 or less, this was regarded as acceptable.

Moreover, banding evaluation was as follows. A maximum banding intensity of 2.00 or less: ○, 2.01 to 2.20: Δ, and 2.21 or more: X.

Toner Fuel Consumption Test:

The rubber-coated roller to which the coating liquid of each specification was applied was inserted into a cartridge (TN-27J, produced by Brother Industries, Ltd.) of a monochrome laser printer (HL-2240D, produced by Brother Industries, Ltd.), and a test after 3K durability was carried out in an ordinary temperature and ordinary humidity environment (23° C., 50% RH) according to ISO/IEC 19752.

Fuel consumption was evaluated as follow: when blur did not occur during printing, this case was evaluated as ○, and when blur occurred during printing, this case was evaluated as X.

Prepolymer Components:

(1) Duranate E402-80B
  Urethane modified hexamethylene diisocyanate, produced by Asahi Kasei Corp.
  (Solid matters content: 80%)
  Adduct type represented by the R1(OCONHRNCO)3
  NCO: 7.3 wt. %
  Viscosity: 350 mPa·s/25° C.
  Solvent: n-butyl acetate (2) Duranate TPA-100
  Urethane modified hexamethylene isocyanurate, produced by Asahi Kasei Corp.
  (Solid matters content: 100%)
  Isocyanurate represented by the
  NCO: 23.1 wt. %
  Viscosity: 1400 mPa·s/25° C.

(3) Coronate HXLV
  Urethane modified hexamethylene isocyanurate, produced by Tosoh Corporation
  (Solid matters content: 100%)
  Polyisocyanate for coating
  NCO: 22.5 to 23.9 wt. %
  Viscosity: 800 to 1500 mPa·s/25° C.

(4) Burnock DN-981
  Urethane modified hexamethylene isocyanurate, produced by DIC Corporation.
  (Solid matters content: 75%)
  NCO: 13.0 to 14.0 wt. %
  Viscosity: Gardner (25° C.) A-D
  Solvent: ethyl acetate
  Reactive silicone oil components:
    Silicone Oil X-22-160AS, produced by Shin-Etsu Chemical Co., Ltd.
    Reactive group: —C3H6OC2H4OH
    Viscosity: 35 mPa·s
    Reactive group equivalent: 470 g/mol Compounding Ingredients:
(1) Same as the prepolymer component (1)
(2) Same as the prepolymer component (2)
(3) Same as the prepolymer component (3)
(4) Same as the prepolymer component (4)
(5) Zeffle
  Fluorine-containing polyol GK-510, produced by Daikin Industries, Ltd
  (Solid matters content: 50%)
  Tetrafluoroethylene copolymer polyol
  Solvent: n-butyl acetate
Silicone rubber particles
(6) EP-2720 powder, produced by Dow Corning Toray Co., Ltd.
(7) EP-2601 powder, produced by Dow Corning Toray Co., Ltd.

Table 1 shows the prepolymers, compounding ingredients, binder component formations, and the results of image quality evaluation. The number of each component is represented by part by weight, and the total thereof is 100.0 parts by weight.

TABLE 1

|  | Example | | | | |
| --- | --- | --- | --- | --- | --- |
|  | 1 | 2 | 3 | 4 | 5 |
| Prepolymer (a) | | | | | |
| Component (1) | 14.5 | 8.7 | 8.7 | 17.1 | 8.7 |
| Component (2) | 2.2 | 4.4 |  |  | 4.4 |
| Component (3) |  |  | 4.4 |  |  |
| Component (4) |  |  |  | 1.8 |  |
| Reactive silicone oil | 36.2 | 38.6 | 38.6 | 35.0 | 38.6 |
| n-butyl acetate | 47.1 | 48.3 | 48.3 | 46.1 | 48.3 |
| Compounding ingredients (A) Binder | | | | | |
| (a) Prepolymer | 35.0 | 37.0 | 38.8 | 36.5 | 25.3 |
| (b) Component | | | | | |
| Component (1) | 10.0 | 10.9 | 5.2 | 6.8 | 12.7 |
| Component (2) |  |  |  |  | 0.4 |
| Component (3) |  |  | 2.0 |  |  |
| Component (4) |  |  |  | 2.4 |  |

TABLE 1-continued

|  | Example | | | | |
|---|---|---|---|---|---|
|  | 1 | 2 | 3 | 4 | 5 |
| (c) Polyol | | | | | |
| Component (5) | | | | | 10.1 |
| (d) Diluting solvent | | | | | |
| n-butyl acetate | 46.5 | 45.3 | 45.5 | 45.8 | 43.0 |
| (B) Silicone rubber particles | | | | | |
| Silicone rubber particles (6) | | | | 8.5 | |
| Silicone rubber particles (7) | 8.5 | 6.8 | 8.5 | | 8.5 |
| Binder component formations [%] | | | | | |
| Silicone component | 49.6 | 52.5 | 58.7 | 50.1 | 38.4 |
| Isocyanate component | 47.4 | 41.5 | 26.8 | 40.9 | 46.6 |
| Isocyanurate component | 3.0 | 6.0 | 15.0 | 9.0 | 6.0 |
| Polyol component | | | | | 9.0 |
| Electrostatic capacitance (nF) | 17.6 | 9.6 | 4.9 | 7.3 | 9.0 |
| Image quality evaluation | | | | | |
| Maximum banding intensity | 2.0 | 1.9 | 1.6 | 1.6 | 2.0 |
| Evaluation | ○ | ○ | ○ | ○ | ○ |
| Toner fuel consumption test | | | | | |
| Evaluation | ○ | ○ | ○ | ○ | ○ |

Comparative Examples 1 to 3

In Example 1, only one of the prepolymer components (1) and (2) was used. Table 2 below shows the obtained results.

TABLE 2

|  | Comparative Example | | |
|---|---|---|---|
|  | 1 | 2 | 3 |
| Prepolymer (a) | | | |
| Component (1) | 20.0 | | |
| Component (2) | | 7.4 | 7.8 |
| Reactive silicone oil | 34.0 | 40.0 | 42.2 |
| n-butyl acetate | 46.0 | 52.6 | 50.0 |
| Compounding ingredients (A) Binder | | | |
| (a) Prepolymer (b) Component | 35.2 | 41.6 | 43.5 |
| Component (1) | 9.9 | | |
| Component (2) | | 5.9 | 3.7 |

TABLE 2-continued

|  | Comparative Example | | |
|---|---|---|---|
|  | 1 | 2 | 3 |
| (d) Diluting solvent | | | |
| n-butyl acetate | 46.4 | 44.0 | 44.3 |
| (B) Silicone rubber particles | | | |
| Silicone rubber particles (6) | 8.5 | | 8.5 |
| Silicone rubber particles (7) | | 8.5 | |
| Binder component formations [%] | | | |
| Silicone component | 46.9 | 65.0 | 72.0 |
| Isocyanate component | 53.1 | | |
| Isocyanurate component | | 35.0 | 28.0 |
| Electrostatic capacitance (nF) | 29.8 | 3.0 | 3.2 |
| Image quality evaluation | | | |
| Maximum banding intensity | 2.1 | 1.5 | 1.5 |
| Evaluation | Δ | ○ | ○ |
| Toner fuel consumption test | | | |
| Evaluation | ○ | X | X |

Table 3 below shows each component (wt. %) of the binder components in the above Examples and Comparative Examples.

TABLE 3

|  | (a) Component prepolymer | | | (b) Component | | |
|---|---|---|---|---|---|---|
| Example | NCO compound | Iso-cyanurate | Si Oil | NCO compound | Iso-cyanurate | Electrostatic capacitance |
| Example 1 | 15.9 | 3.0 | 49.7 | 31.4 | 0 | 17.6 |
| Example 2 | 9.4 | 6.0 | 52.5 | 32.0 | 0 | 9.6 |
| Example 3 | 10.6 | 6.7 | 58.6 | 16.3 | 7.8 | 4.9 |
| Example 4 | 19.6 | 1.9 | 50.1 | 21.3 | 7.1 | 7.3 |
| Example 5 | 7.6 | 4.8 | 42.1 | 43.8 | 1.7 | 9.0 |
| Comparative Example 1 | 22.1 | 0 | 46.8 | 31.0 | 0 | 29.8 |
| Comparative Example 2 | 0 | 12.0 | 64.9 | 0 | 23.1 | 3.0 |
| Comparative Example 3 | 0 | 13.3 | 72.1 | 0 | 14.5 | 3.2 |

From the above results, it can be said that in order to achieve an electrostatic capacitance of 4 to 20 nF, preferably 4 to 10 nF, the ratio of the isocyanurate modified product in the binder component as solid matters, which are the total amount of the components (a) and (b), must be preferably 1.5 to 10 wt. %.

The invention claimed is:

1. A developing roller having a rubber elastomer layer on the outer periphery of a shaft core metal, having a coating layer formed from a binder (A) and silicone rubber particles (B) on the surface of the rubber elastomer, and having an electrostatic capacitance of 4 to 20 nF; wherein the binder (A) is formed from a diluting solvent solution of a terminal hydroxyl group-containing prepolymer (a) obtained by reaction of an isocyanate compound, an isocyanurate modified product thereof and a reactive silicone oil, and an isocyanate compound and/or an isocyanurate modified product thereof (b).

2. The developing roller according to claim 1, which has an electrostatic capacitance of 4 to 10 nF.

3. The developing roller according to claim 1, wherein the isocyanurate modified product is used at a ratio of 1 to 20 wt. % in the amount of the binder component, which is the total solid matter of the components (a) and (b).

4. The developing roller according to claim 3, wherein the isocyanurate modified product is used at a ratio of 1.5 to 10 wt. % in the binder component as solid matters.

5. The developing roller according to claim 1, wherein the silicone rubber particles have a particle size of 0.2 to 10 μm.

6. The developing roller according to claim 1, wherein a coating layer-forming component comprising a binder and silicone rubber particles, prepared as a diluting solvent solution, has a solid matters content of 10 to 50 wt. % in the solution.

7. A developing roller coating liquid comprising a binder (A) and silicone rubber particles (B), wherein the binder (A) is formed from a diluting solvent solution of a terminal hydroxyl group-containing prepolymer (a) of an isocyanate compound, an isocyanurate modified product thereof and a reactive silicone oil, and an isocyanate compound and/or an isocyanurate modified product thereof (b).

8. The coating liquid according to claim 7, wherein the silicone rubber particles are used in an amount of 3 to 30 wt. % in the coating liquid.

9. The coating liquid according to claim 7, wherein the isocyanurate modified product is used at a ratio of 1 to 20 wt. % in the amount of the binder component, which is the total solid matter of the components (a) and (b).

10. A method for producing a developing roller coating liquid, comprising performing a prepolymerization reaction by reacting an isocyanate compound, an isocyanurate modified product thereof and a reactive silicone oil in a diluting solvent capable of dissolving these components, where the reaction is performed in a state in which each component is dissolved in the solvent, to form a prepolymer having a terminal hydroxyl group, and adding then silicone rubber particles.

11. The method for producing a developing roller coating liquid according to claim 10, wherein the diluting solvent is an acetate, ketone, or aromatic or aliphatic hydrocarbon.

12. The method for producing a developing roller coating liquid according to claim 11, wherein at least one of an isocyanate compound and an isocyanurate modified product thereof that are the same as those used for prepolymer formation are used in combination with the diluting solvent.

* * * * *